United States Patent [19]

Aoki

[11] Patent Number: 5,289,089

[45] Date of Patent: Feb. 22, 1994

[54] MOTOR DRIVE CIRCUIT AND MOTOR DRIVE SYSTEM USING THE CIRCUIT THEREOF

[75] Inventor: Yuichi Aoki, Ohtsu, Japan

[73] Assignee: Rohm Co., Ltd., Kyoto, Japan

[21] Appl. No.: 886,099

[22] Filed: May 21, 1992

[30] Foreign Application Priority Data

May 23, 1991 [JP] Japan .................... 3-147761

[51] Int. Cl.[5] .................... H02K 29/08; H02P 6/02
[52] U.S. Cl. .................... 318/254; 318/138; 318/439
[58] Field of Search ................ 318/138, 254, 293, 439

[56] References Cited

U.S. PATENT DOCUMENTS

| | | | |
|---|---|---|---|
| 4,319,170 | 3/1982 | Brent | 318/376 |
| 4,545,004 | 10/1985 | Kade et al. | 363/63 |
| 4,584,504 | 4/1986 | Lee et al. | 318/16 |
| 4,701,683 | 10/1987 | Kikkawa | 318/254 |
| 4,859,916 | 8/1989 | McCambridge | 318/293 |
| 4,924,158 | 5/1990 | Kelley et al. | 318/434 |
| 4,972,130 | 11/1990 | Rossi et al. | 318/293 |
| 4,988,931 | 1/1991 | Tsukahara et al. | 318/293 |

*Primary Examiner*—Bentsu Ro
*Attorney, Agent, or Firm*—Fay, Sharpe, Beall, Fagan, Minnich & McKee

[57] ABSTRACT

A motor drive circuit comprising, an amplifier which receives output signals of a Hall element for determining the phase of the rotor in a single phase DC motor and outputs the same after amplification; a drive signal generating circuit which receives the amplified signals of the amplifier, generates first and second pulses each having a duty of about 50% of which phases differ by about 180° and outputs the same; a first drive circuit connected to a first terminal of the single phase DC motor and a second drive circuit connected to a second terminal of the single phase DC motor. The first and second drive circuits each including, a first transistor circuit which supplies a current to the single phase DC motor; a second transistor circuit which sinks a current from the single phase DC motor; and a diode which bypasses a current flown out from the single phase DC motor toward a power source line side.

6 Claims, 3 Drawing Sheets

(a) OUTPUT OF HALL ELEMENT (AFTER AMPLIFICATION)

(b) CONTROL SIGNAL 4a (c) CONTROL SIGNAL 5a (d) TRANSISTOR $Q_{12}$ (e) TRANSISTOR $Q_{14}$

MOTOR DRIVE CIRCUIT AND MOTOR DRIVE SYSTEM USING THE CIRCUIT THEREOF

BACKGROUND OF THE INVENTION

1. Field of the Invention

The present invention relates to a motor drive circuit (hereinbelow called as motor driver) the circuit thereof and more particularly, relates to a small sized DC motor at a high torque and with a high efficiency, reduces noise generation and is suitable for forming in an I C/ and further relates to a motor drive system in which the circuit thereof is incorporated in a motor or mounted thereon.

2. Description of Related Art

FIG. 2 is a block diagram showing a conventional fan motor driver in an IC form which was mounted such as on an electronic device and a motor drive system including a fan motor driven thereby. The present example comprises a Hall element I fitted outside with respect to an IC, a fan motor driver 9 in an IC form which receives the output from the Hall element 1 and applies a drive current to a fan motor 8 in response to the received output and the fan motor 8 driven by the IC fan motor driver 9. A two phase DC brushless motor is usually used for the fan motor 8 (hereinbelow simply called motor 8). As such motor 8, a DC motor in which the stator thereof is provided with a coil which generates a rotating magnetic field and the rotor thereof is formed of a permanent magnet is generally employed. The Hall element 1 determines the rotating phase of the motor by detecting the magnetic field generated by the permanent magnet rotor. The motor driver 9 is provided with, within the IC, an amplifier 2 (hereinbelow abbreviated as AMP 2), a drive pulse generating circuit 3 and first and second drive circuits 4 and 5 which output a driving current to the motor 8. The AMP 2 amplifies the output signal from the Hall element 1 and outputs the same, and the drive pulse generating circuit 3 wave-shapes the output signal from the AMP 2 and outputs two drive pulses 4a and 5a (see (b) and (c) in FIG. 3) having a phase difference of 180° each with respect to other and duties of about 50%. The first drive circuit 4 switches between being and not being electrically conductive between the external terminal 6 thereof and the grounding terminal in response to the drive pulse 4a received at its input side, namely, the first drive circuit 4 sinks the driving current supplied to the motor from the power source line +Vcc toward the grounding line via a so called switching operation. The second drive circuit 5 is a circuit performing the same operation as the first drive circuit, in that it forms the switching operation of electrical conduction and interruption between the external terminal 7 and the grounding line in response to the drive pulse 5a received at its input side.

More specifically, the first drive circuit 4 is composed of transistors Q11 and Q12 in Darlington connection, the collector of the transistor Q11 at the drive stage is connected to the external terminal 6 and the base thereof is adapted to receive the drive pulse 4a. The collector of the transistor Q12 at the output stage is connected to the external terminal 6, the base thereof is connected to the emitter of the transistor Q11 and the emitter thereof is connected to the grounding line. The first five circuit further comprises a zenor diode Z1 having the cathode connected to the external terminal 6 and the anode connected to the base of the transistor Q11. The second drive circuit 5 is likely composed of transistor Q13 and Q14 in Darlington connection. The collector of the transistor Q13 at the drive stage is connected to the external terminal 7 and the base thereof is adapted to receive the driving pulse 5a. The collector of the transistor Q14 at the output stage is connected to the external terminal 7, the base thereof is connected to the emitter of the transistor Q13 and the emitter thereof is connected to the grounding line. Like the first drive circuit 4, the second drive circuit 5 further comprises a zenor diode Z2 having the cathode connected to the external terminal 7 and the anode thereof connected to the base of the transistor Q13.

The operation of the conventional fan driver having the above constitution is explained hereinbelow with reference to the signal waveforms shown in FIG. 3.

In order to determine the phase of the fan motor rotor the output signal of the Hall element 1 is inputted to the AMP 2 and the amplified signal ((a) in FIG. 3) outputted by the AMP 2 is applied to the drive pulse generating circuit 3. The drive pulse generating circuit 3 wave-shapes the input signal from the AMP 2, for example by means of a logic circuit, corrects the phase thereof and generates two drive pulses 4a (see (b) in FIG. 3) and 5a (see (c) in FIG. 3) which differ in their phases by about 180° from each other and have waveforms of inverted relation each other.

The drive pulse 4a is applied to the base of the transistor Q11 in the first drive circuit 4. The drive pulse 5a is applied to the base of the transistor Q13 in the second drive circuit 5. Now, in the first drive circuit 4 when the drive pulse 4a is at a HIGH level (hereinbelow indicated as "ON") the transistor Q12 is turned "ON" and the path between the external terminal 6 and the grounding line is rendered electrically conductive (see (d) in FIG. 3). As a result, a drive current from the power line +Vcc is supplied to one coil 8a of the two phase motor 8 and flows toward the external terminal 6. When the drive pulse 4a is at Low level (hereinbelow indicated as "OFF") the transistor Q12 is turned "OFF" and the path between the external terminal 6 and the grounding line is electrically interrupted (see (d) in FIG. 3). As a result, the drive current in the coil 8a is interrupted. Due to the disappearance of the drive current flow path at this moment a voltage induced in the coil 8a is applied to the zenor diode Z1 and when the voltage exceeds the breakdown voltage of the zenor diode the current flows therethrough and the energy thereof is dissipated thereat.

The operation of the second drive circuit 5 is the same as that of the first drive circuit 4 except that the phase of the input signal differs from that of the first drive circuit 4 by 180°. When the drive pulse 5a is "ON", the transistor Q14 is turned "ON", therefore the path between the external terminal 7 and the grounding line is rendered electrically conductive (see (e) in FIG. 3). As a result, a drive current from the power source line +Vcc is supplied to the other coil 8b of the two phase motor 8, and flows toward the external terminal 7. When the drive pulse 5a is rendered "OFF", the transistor Q14 is turned "OFF", therefore, the path between the external terminal 7 and the grounding line is electrically interrupted (see (e) in FIG. 3). Thereby, the driving current in the coil 8b is interrupted and the current flowing in the coil 8b flows via the zenor diode Z2 and is dissipated thereat in the same manner as above.

As explained above, the fan motor driver 9 generates within the IC the two drive pulses 4a and 5a of which phases differ by 180° from each other and alternately supplies the drive current to the two coils 8a and 8b of the motor 8 to rotate the rotor of the fan motor.

Because such IC motor driver is only rendered conductive &rom the external terminals 6 and 7 to the ground line, such DC motors are almost limited to the two phase DC motor. Further, in such driver the two motor coils have to be driven alternatively, and the generated motor torque is low in comparison with the size thereof to thereby lower the efficiency thereof. Still further, because the counter electromotive force generated in the motor coils is dissipated via the zenor diodes, noise is likely generated during the switching of the driving current, therefore in case that the fan motor was mounted on an electronic device there was a high possibility that such driver circuit adversely affected other circuits.

In order to reduce the internal temperature rise of electronic devices such motor driver and fan motor are generally mounted on the electronic devices, it is desired that such motor driver is formed in an IC and further the size thereof is desired as small as possible. Further, the power efficiency of the fan motor mounted on the electronic device is desired as high as possible. It is undesirable that power consumption of the fan motor is large since the circuits therefor are formed in a high integration and with a low power consumption.

SUMMARY OF THE INVENTION

The present invention contemplates a DC motor drive system with a high efficiency, which suppresses noise generation, which employs a single phase motor, which employs a motor drive circuit to drive the single phase motor and is suitable for forming in an IC. An AMP receives output signals of a Hall element for determining the phase of the rotor in the signal phase motor and outputs the same after amplification. A drive signal generating circuit receives the amplified signal from the AMP, generates first and second pulses having a duty of about 50% of which phases differ by bout 180° from each other and outputs the same. A first drive circuit is connected to the first terminal of the single phase DC motor and a second drive circuit is connected to the second terminal of the single phase DC motor, and the first and second drive circuits respectively comprise a first transistor which supplies a drive current to the single phase DC motor, a second transistor which sinks the drive current from the single phase DC motor and a diode which bypasses the current flown out from the single phase DC motor toward a power source line when the second transistor is turned "OFF", whereby the first and second drive circuits respectively receive the first and second pulses and serve alternatively as a current flow out side and as current sink side with respect to each other to drive the single phase DC motor.

Further, in the motor drive system according to the present invention the motor driver having the above explained structure and the Hall element are incorporated in the motor or mounted thereon.

In the above constitution, like the conventional driver, the output signals from the Hall element for determining the phase of the rotor in the single phase DC motor are received and are amplified at the AMP, and the amplified signals are wave-shaped and phase-corrected at the drive signal generating circuit so as to generate the first drive pulse and the second drive pulse of which phases differ by about 180° and the first drive circuit and the second drive circuit are respectively driven in response to the first drive pulse and second drive pulse. As a result, like the conventional driver a motor driver which is suitable for forming in an IC is realized, further the single phase DC motor can be used as the driven motor, a small sized motor drive system having a high electric power efficiency is realized. Still further, the drive current flown out from the motor when the second transistor is turned "OFF" is bypassed to the power source line via the diode so that the noise generation is suppressed.

Accordingly, an object of the present invention is provide a motor driver which reduces noise and is suitable for driving a motor mounted on an electronic device.

Another object of the present invention is to provided a motor drive system having a high efficiency and suitable for mounting on an electronic device.

DESCRIPTION OF THE PREFERRED EMBODIMENT

Figure 1:
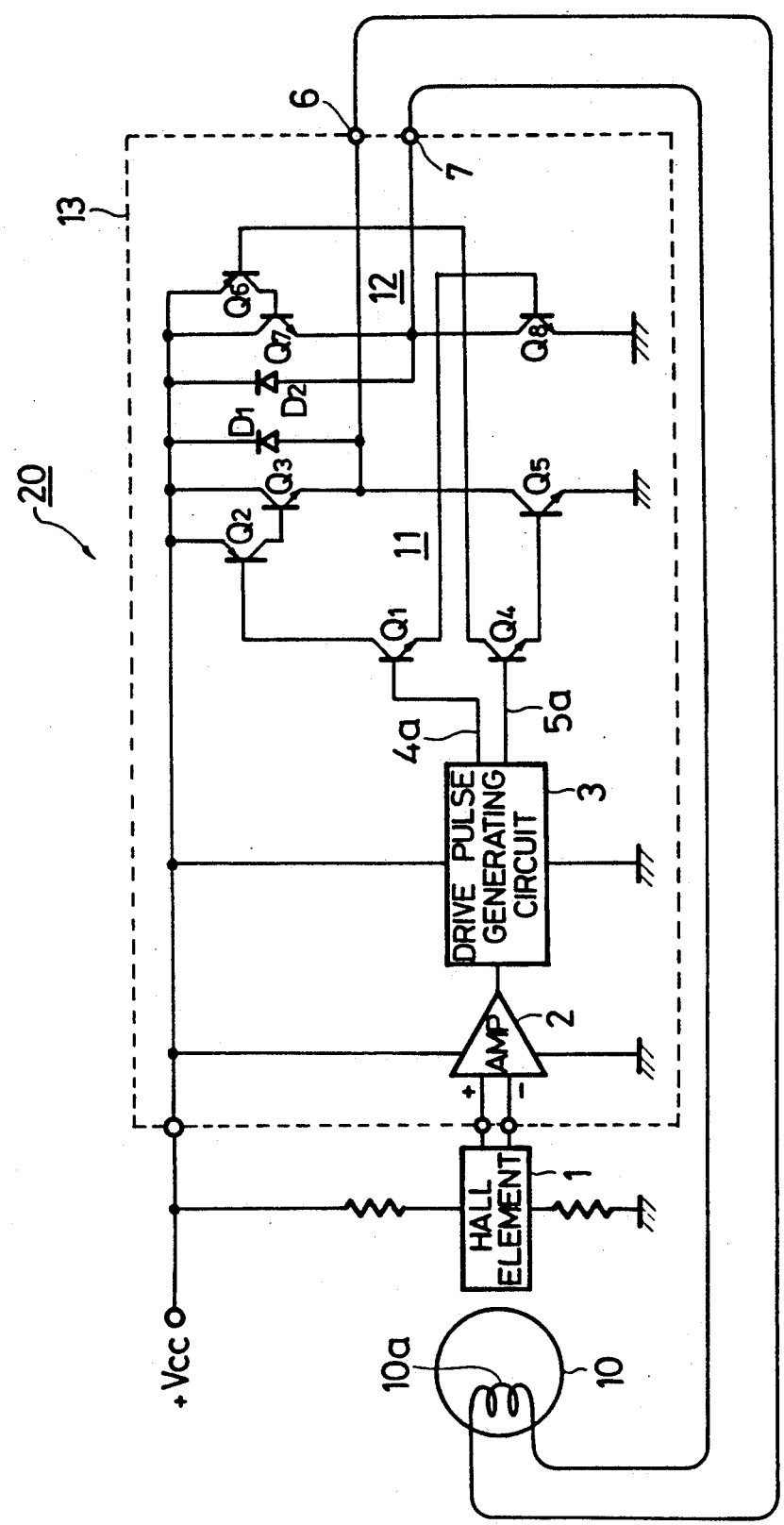
FIG. 1 is a block diagram of a fan motor drive system, one embodiment of the motor drivers and motor drive systems using the same according to the present invention.
Figure 2:
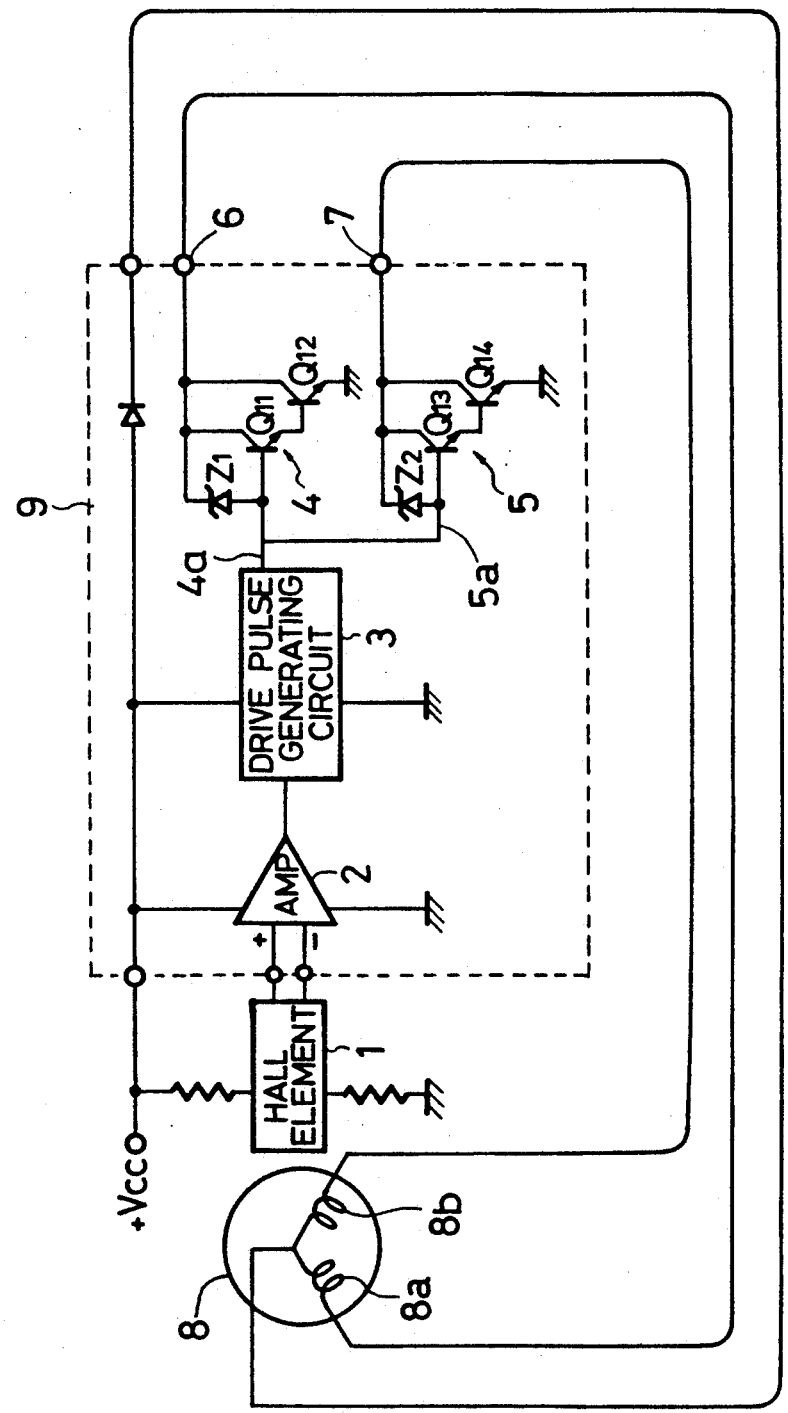
FIG. 2 is a circuit diagram of a conventional motor driver.

A fan motor drive system 20 in FIG. 1 is composed of a Hall element 1 for determining the phase of the rotor in a fan motor 10, a fan motor driver 13 and the single phase brushless DC motor 10 which comprises a permanent magnet rotor and a stator having a single coil. The fan motor driver 13 is an IC which is provided with an AMP 2 which is adapted to receive the output signals of the Hall element 1, a drive pulse generating circuit 3 which is adapted to receive the output of the AMP 2 and drive circuits 11 and 12 which are adapted to receive the output of the drive pulse generating circuits. The structure and operation of the AMP 2 and the drive pulse generating circuit 3 are the same as those of the conventional ones. The drive pulse generating circuit 3 wave-shapes the output signals of the AMP 2 and outputs two drive pulses 4a and 5a of which phases are inverted by about 180°. The drive circuit 11 generates a drive current at an external terminal 6 and transmits the drive current to a coil 10a of the fan motor 10 or sinks the drive current flowing in the coil 10a in accordance with the drive pulses 4a and 5a. The drive circuit 12 generates a drive current of the inverted phase with that in the drive circuit 11 at an external terminal 7 and transmits the drive current to the coil 10a in the fan motor 10 or sinks the drive current flowing in the coil 10a in accordance with the drive pulses 4a and 5a.

More specifically, the first drive circuit 11 includes transistors Q1, Q2, Q3 and Q5 and the base of the transistor Q1, the transistor at the drive stage, receives the drive pulse 4a. The collector output side of the transistor Q1 is connected to the base of the transistor Q2 at the drive stage of transistors Q2 and Q3 in Darlington connection and via the output thereof the transistor Q2 is driven. The emitter output side of the transistor Q1 is connected to the base of a transistor Q8 in the second driver circuit 12 and via the output thereof the transistor Q8 is driven. The emitter side of the transistor Q2 is connected to the power source line Vcc and the collector side thereof is connected to the base of the transistor Q3. The emitter side of the transistor Q3 is connected to the external terminal 6 and the connector side thereof is connected to the power source line +Vcc.

The second drive circuit 12 includes transistor Q4, Q6, Q7 and Q8 and the base of the transistor Q4, the transistor at the drive stage receives the drive pulse 5a. The collector output side of the transistor Q4 is connected to the transistor Q6 at the drive stage of the transistors Q6 and Q7 in Darlington connection and via the output thereof the transistor Q6 is driven. The emitter output side of the transistor Q4 is connected to the base of the transistor Q5 in the first driver circuit and via the output thereof the transistor Q5 is driven. The emitter side of the transistor Q6 is connected to the power source line +Vcc and the collector side thereof is connected to the base of the transistor Q7. The emitter side of the transistor Q7 is connected to the external terminal 7 and the collector side thereof is connected to the power source line +Vcc.

Further, in parallel with the transistor Q3 a switching diode D1 is provided of which cathode is connected to the power source line +Vcc and of which anode is connected to the external terminal 6, and in parallel with the transistor Q7 a switching diode D2 is provided of which cathode is connected to the power source line +Vcc and of which anode is connected to the external terminal 7. These diodes constitute circuits which bypass the current flowing out from the motor to the power source line +Vcc when the transistor Q5 or Q8 is turned "OFF".

Figure 3:
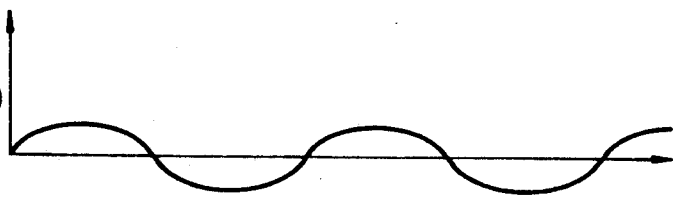
FIG. 3 shows synchronized signal waveforms for explaining the operation of the conventional motor driver circuit.
Figure 3:
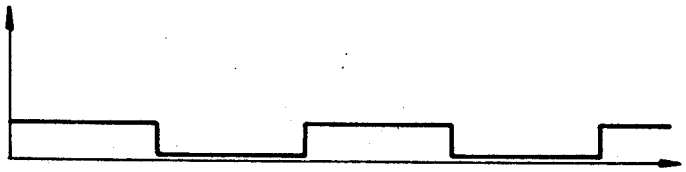
Figure 3:
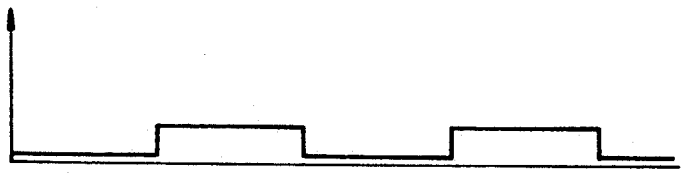
Figure 3:
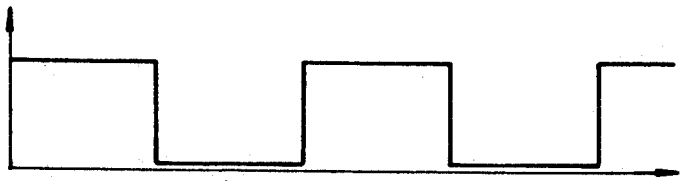
Figure 3:
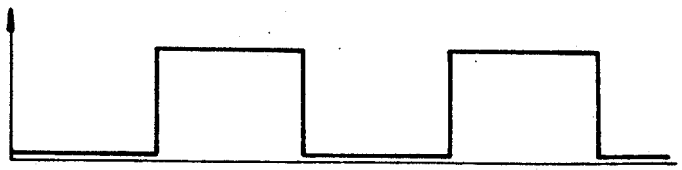

In such circuit constitution like the conventional one, the phase determination signal obtained from the Hall element 1 for determining the phase of the rotor in the fan motor is amplified in the AMP 2 and based on the amplified signal (see (a) in FIG. 3) the drive pulses 4a and 5a are generated. Different from the conventional one, in the present embodiment, under the condition that the drive pulse 4a is "ON" and the drive pulse 5a is "OFF" (see (b) and (c) in FIG. 3) the external terminal 6 is electrically interrupted from the grounding line and is connected to the power source line +Vcc, and the external terminal 7 is electrically interrupted from the power source line +Vcc and is connected to the grounding line. Thereby the drive current flows from the external terminal 6 to the coil 10a and further to the external terminal 7.

Now, the specific operation of the circuit is explained. At first, when the drive pulse 4a is rendered "ON", the transistor Q1 is turned "ON", the transistor Q2 is turned "ON" and further the transistor Q3 is turned "ON". When the transistor Q3 is turned "ON", the external terminal 6 is electrically connected to the power source line +Vcc. Further, when the transistor Q1 is turned "ON", the transistor Q8 is also turned "ON", and the external terminal 7 is electrically connected to the grounding line. On the other hand, when the drive pulse 5a is rendered "OFF", the transistor Q4 is turned "OFF", the transistor Q6 is turned "OFF" and the transistor Q7 is also turned "OFF". When the transistor Q7 is turned "OFF", the external terminal 7 is electrically interrupted from the power source line +Vcc. Further, when transistor Q4 is turned "OFF", the transistor Q5 is also turned "OFF" and the external terminal 6 is electrically interrupted from the grounding line.

As a result, a drive current flows from the external terminal 6 via the coil 10a of the fan motor 10 and the external terminal 7 to the grounding line. Further, the current flown-in from the coil 10a via the external terminal 6 which is caused when the transistor Q5 is turned "OFF" flows toward the power source line +Vcc via the high speed switching diode D1.

Subsequently, when the drive pulse 4a is rendered "OFF" and the drive pulse 5a is rendered "ON" (see (b) and (c) in FIG. 3) the external terminal 6 is electrically interrupted from the power source line +Vcc and is connected to the grounding line, and the external terminal 7 is electrically interrupted from the grounding line and is connected to the power source line +Vcc, and contrary to the above, a drive current flows from the external terminal 7 via the coil 10a toward the external terminal 6.

With regard to more specific operation of the above, when the drive pulse 4a is rendered "OFF", the transistor Q1 is turned "OFF", the transistor Q2 is turned "OFF" and the transistor Q3 is also turned "OFF". When the transistor Q3 is turned "OFF", the external terminal 6 is electrically interrupted from the power source line +Vcc. Further, when the transistor Q1 is turned "OFF", the transistor Q8 is also turned "OFF" and the external terminal 7 is electrically interrupted from the grounding line. On the other hand, when the drive pulse 5a rendered "ON", the transistor Q4 is turned "ON", the transistor Q6 is turned "ON" and the transistor Q7 is also turned "ON". When the transistor Q7 is turned "ON", the external terminal 7 is electrically connected to the power source line +Vcc. Further, when the transistor Q4 is turned ON ", the transistor Q5 is turned "ON" and the external terminal 6 is electrically connected to the grounding line.

As a result, a drive current flows from the external terminal 7 via the coil 10a of the fan motor 10 and external terminal 6 to the grounding line. Further, the flow-in current from the coil 10a via the external terminal 7 when the transistor Q8 is turned "OFF" flows toward the power source line +Vcc via the high speed switching diode D2.

As explained above, by applying the power source voltage between the external terminals 6 and 7 and switching the direction thereof alternatively drive currents of inverted phase which are alternatively full-wave-rectified can be flown into the coil 10a of the fan motor 10. Thereby the switching of the coils which was encountered in connection with the two phase DC motor was eliminated and the fan motor of the present embodiment can be driven with a high efficiency.

As explained hereinabove, according to the present invention, the flow-in current induced by the energy stored in the motor coil is bypassed toward the power source side by means of the high speed switching diode, thereby, the noise caused during drive current switching is reduced. As a result, reliability of the circuit is enhanced. Further, according to the present invention in place of the conventional two phase DC brushless motor, the signal phase DC brushless motor is used, thereby the entire exciting coil is always used, the torque of the motor is increased and the efficiency thereof is also improved. Further, the similar Hall element as in the conventional one can be used and likely the similar AMP and drive signal generating circuit in the fan motor driver as in the conventional circuit can be used, the fan motor driver of the present invention can be formed in an IC in the same manner as in the conventional one only by modifying the first and second drive circuits. Still further, by making use of the single phase DC motor in place of the conventional two phase DC motor, the structure of the motor is simplified, the size thereof is reduced and the cost thereof is also reduced.

As a result, a fan motor driver in an IC form which is suitable for mounting on an electronic device is realized and when the IC fan motor driver is incorporated into the fan motor side together with the Hall element, a fan motor drive system as a whole is constituted.

Further, in the above embodiment a fan motor is exemplified, however the present invention is not limited thereto, the present invention is applicable to any motor drive systems which use a single phase bushless DC motor.

I claim:

1. A motor drive circuit comprising,
   an amplifier which receives output signals of a Hall element for determining the phase of the rotor in a single phase DC motor and outputs the same after amplification;
   a drive signal generating circuit which receives the amplified signals of said amplifier, generates first and second pulses each having a duty of about 50% of which phases differ by about 180° and outputs the same;
   a first drive circuit connected to a first terminal of said single phase DC motor;
   a second drive circuit connected to a second terminal of said single phase DC motor;
   said first and second drive circuits each including, a first transistor circuit which supplies a current to said single phase DC motor, a second transistor circuit which sinks a current from said single phase DC motor, and a diode which bypasses a current flown out from said single phase DC motor toward a power source line side, whereby said first and second drive circuits alternatively serve as a current flow out side and as a current sink side in response to the first and second pulses to drive said single phase DC motor; and
   wherein said amplifier, said drive signal generating circuit and said first and second drive circuits are integrated into one IC, the bypassing diodes toward the power source line side being respectively inserted between the first terminal and the power source line and between the second terminal and the power source line and the combination thereof being mounted on an electric device.

2. A motor drive circuit according to claim 1, wherein the first drive circuit comprises,
   a first transistor of an NPN type, having a base connected to said drive pulse generating circuit, having a collector, and having an emitter,
   a second transistor of a PNP type, having a base connected to the collector of said first transistor, having a collector, and having an emitter connected to the power source,
   a third transistor of an NPN type, having a base connected to the collector of said second transistor, having a collector connected to said power source, and having an emitter connected to said first terminal,
   a fourth transistor of an NPN type having a base, having a collector connected to the emitter of said third transistor, and having an emitter connected to a ground, and
   said diode, having an anode connected to said first terminal, and having a cathode connected to said power source; and
   wherein said second drive circuit comprises
   a fifth transistor of an NPN type, having a base connected to said drive pulse generating circuit, having a collector, and having an emitter connected to the base of said fourth transistor,
   a sixth transistor of a PNP type, having a base connected to the collector of said fifth transistor, having a collector, and having an emitter connected to said power source,
   a seventh transistor of an NPN type, having a base connected to the collector of said sixth transistor, having a collector connected to said power source, and having an emitter connected to said second terminal,
   an eighth transistor of an NPN type, having a base connected to the emitter of said first transistor, having a collector connected to the emitter of said seventh transistor, and having an emitter connected to said ground, and
   said diode having an anode connected to said second terminal, having a cathode connected to said power source.

3. A motor drive circuit according to claim 1 wherein said first transistor circuit in said first drive circuit is a transistor circuit in Darlington connection in which the base thereof is adapted to receive the first pulse and the output thereof is connected to the first terminal, said second transistor circuit in said first drive circuit is a transistor circuit in which the terminal at the current sink side thereof is connected to the first terminal, the base thereof is adapted to receive the second pulse so as to sink the flow-in current toward the first terminal, said first transistor circuit in said second drive circuit is a transistor circuit in Darlington connection in which the base thereof is adapted to receive the second pulse and the output thereof is connected to the second terminal and said second transistor circuit in said second drive circuit is a transistor circuit in which the terminal at the current sink side thereof is connected to the second terminal, the base thereof is adapted to receive the first pulse so as to sink the flow-in current toward the second terminal.

4. A motor drive circuit according to claim 1, wherein said single phase DC motor is used as a fan motor.

5. A motor drive system, comprising,
   a Hall element for determining the phase of the rotor in a single phase DC motor;
   the single phase DC motor;
   a motor drive circuit including an amplifier which receives output signals of said Hall element and outputs the same after amplification,
   a drive signal generating circuit which receives the amplified signals of said amplifier, generates first and second pulses each having a duty of about 50% of which phases differ by about 180° and outputs the same,
   a first drive circuit connected to a first terminal of said single phase DC motor, and
   a second drive circuit connected to a second terminal of said single phase DC motor;

said first and second drive circuits each including a
first transistor circuit which supplies a current to
said single phase DC motor,
a second transistor circuit which sinks a current from
said single phase DC motor, and
a diode which bypasses a current flown out from said
single phase Dc motor toward a power source line
side, whereby said first and second drive circuits
alternately serve as a current flow out side and as a
current sink side in response to the first and second
pulses to drive said single phase DC motor; and
wherein said amplifier, said drive signal generating
circuit and said first and second drive circuits are
integrated into one IC, the bypassing diodes
toward the power source line side being respectively inserted between the first terminal and the
power source line and between the second terminal
and the power source line, and the combination
thereof being mounted on an electric device.

6. A motor drive system according to claim 5,
wherein said first transistor circuit in said first drive
circuit is a transistor circuit in Darlington connection in
which the base thereof is adapted to receive the first
pulse and the output thereof is connected to the first
terminal, said second transistor circuit in said first drive
circuit is a transistor circuit in which the terminal at the
current sink side thereof is connected to the first terminal, the base thereof is adapted to receive the second
pulse so as to sink the flow-in current toward the first
terminal, said first transistor circuit in said second drive
circuit is a transistor circuit in Darlington connection in
which the base thereof is adapted to receive the second
pulse and the output thereof is connected to the second
terminal and said second transistor circuit in said second
drive circuit is a transistor circuit in which the terminal
at the current sink side thereof is connected to the second terminal, the base thereof is adapted to receive the
first pulse so as to sink the flow-in current toward the
second terminal.

* * * * *